Figure 1:
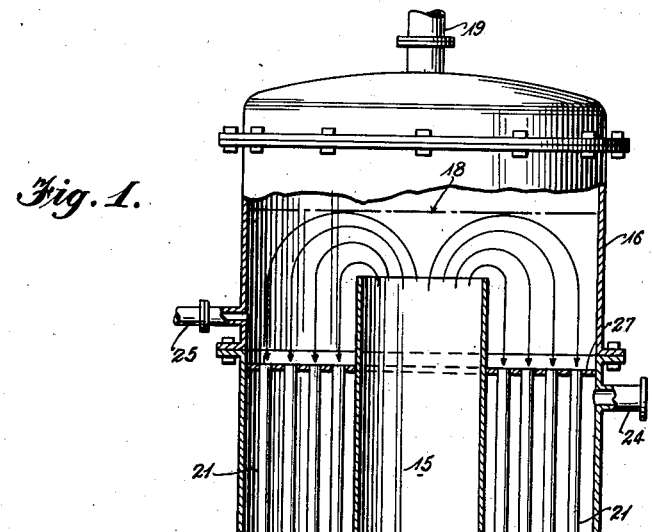

Oct. 9, 1945. S. T. HADDEN 2,386,681
METHOD AND APPARATUS FOR CATALYTIC ALKYLATION
Filed Dec. 13, 1944

Inventor
Stuart T. Hadden

Attorney

Patented Oct. 9, 1945

2,386,681

UNITED STATES PATENT OFFICE 2,386,681

METHOD AND APPARATUS FOR CATALYTIC ALKYLATION

Stuart T. Hadden, Woodbury, N. J., assignor to Socony-Vacuum Oil Company, Incorporated, a corporation of New York Application December 13, 1944, Serial No. 568,040

4 Claims. (Cl. 260—683.4)

This invention relates to a novel method and apparatus for conducting catalytic alkylation of isoparaffins with olefins in the presence of liquid hydrogen fluoride by dispersing a vapor mixture of the reactants into a body of the liquid catalyst according to the process disclosed and claimed in application Serial No. 481,430, filed April 1, 1943 by Arlie A. O'Kelly and Harry G. Doherty.

According to the said prior copending application, marked advantages in catalytic alkylation of hydrocarbons are realized by injecting the reactant charge to the liquid catalyst as a vaporous mixture. This process involves some problems of commercial operation not encountered in connection with the previously known processes for conducting the reaction. In particular, the improved process involves a heat load due to condensation of hydrocarbons in addition to the heat of reaction normally met. The improved results of vapor phase feed make it well worth while to incur the added heat exchange burden and it is a primary object of this invention to provide a method and means for handling that heat load efficiently. The invention also contemplates operations wherein the vaporous charge is heated to a temperature above that of the liquid catalyst before being introduced to the reaction zone as described in the copending application Serial No. 490,487, filed June 11, 1943 by Arlie A. O'Kelly and Jacob R. Meadow.

The objects of the invention are obtained by dispersing the vapor phase charge into the bottom of a confined reaction zone having open top and bottom ends in the nature of a vertical tube. The open top of the reaction zone lies in an enlarged settling zone in which hydrocarbons are separated from acid catalyst by gravity and from the bottom of which the latter is withdrawn to a cooling zone in a line of generally downward flow. The bottom of the cooling zone is in open communication with the bottom of the reaction zone, thus providing a cyclic free path for recirculation of acid catalyst. In order to obtain adequate cooling of the reaction zone, it is necessary that fairly large amounts of catalyst be circulated through the cooling zone. Efficient heat exchange in the cooling zone is only obtained under conditions of rapid, turbulent flow of the acid catalyst therethrough and the present invention contemplates operations wherein the desired turbulent flow is obtained without the necessity of providing moving parts with attendant difficulties arising from stuffing boxes contacted by the highly corrosive hydrogen fluoride.

Figure 2:
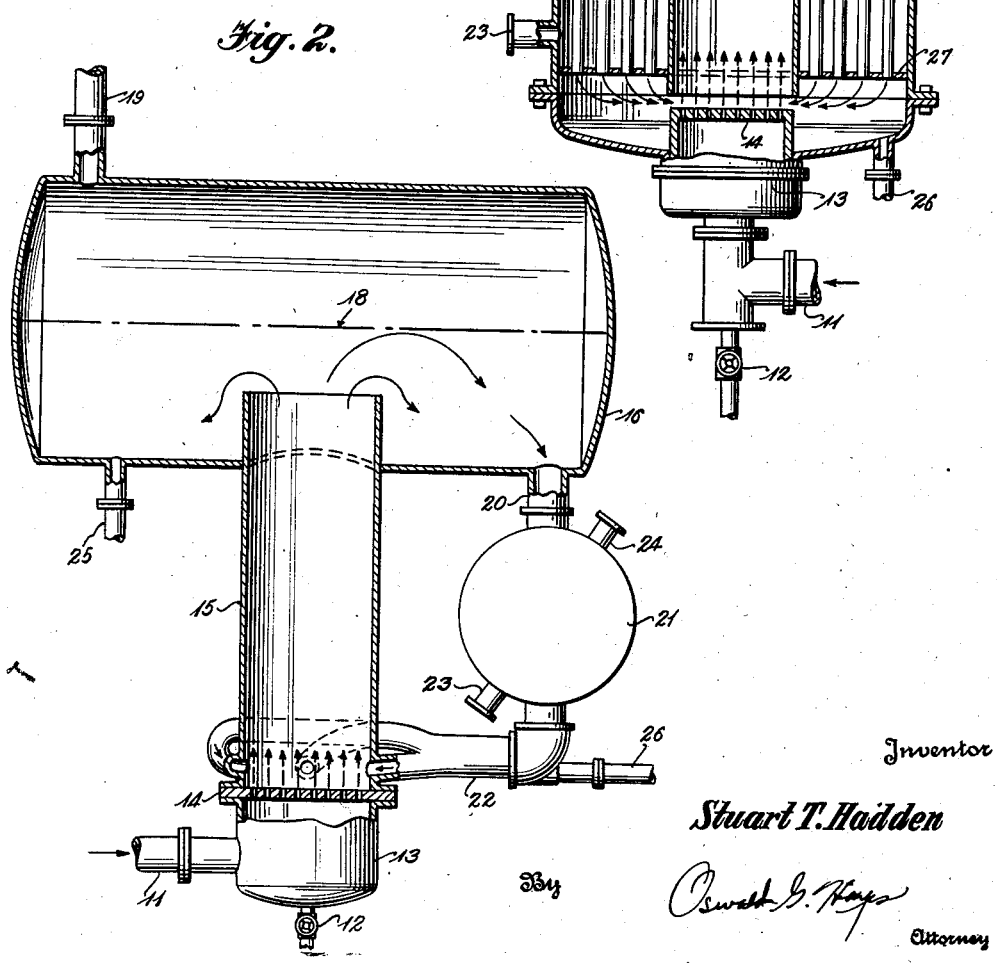

These and other advantages are obtained by inducing circulation of catalyst through the open path including reaction and cooling zones by a combination of thermo-siphon and gas lift effects, augmented by the jet effect of introducing the vapor phase charge through upwardly directed orifices at the bottom of the reaction zone. The nature of the invention will be more clearly understood from consideration of two preferred embodiments thereof, illustrated by the annexed drawing, wherein:

Figure 1 is an elevation in partial section of a reactor embodying the principles of the invention; and Figure 2 is an elevation in partial section of another suitable reactor structure for practice of the invention.

Referring specifically to Figure 1, a vapor phase charge mixture of isoparaffins and olefins is supplied by pipe 11 to a vapor chamber 13 having a suitable valved drain line 12. The upper surface of the vapor chamber 13 is defined by a plate 14 having a number of small orifices to admit the charge to vertical reaction zone 15 which is filled with liquid hydrogen fluoride. The multiple jets of gas so admitted have an injector effect that tends to cause upward flow of liquid in reaction zone 15 and, in addition, the gas bubbles, and the dispersion of liquid to which the gas condenses, have a carrying effect that further acts to cause upward flow in the reaction zone 15. The velocity of circulation is still further augmented by a thermo-siphon action that will appear as the description proceeds.

The open upper end of reaction zone 15 lies in an enlarged settling zone indicated generally at 16 in which the liquid dispersion from the reaction zone stratifies to provide an upper hydrocarbon layer and a lower acid layer. The bottom of settling zone 16 is provided with open ports to heat exchange tubes in a cooling zone 21 through which is circulated a suitable cooling medium by means of inlet and outlet 23 and 24. The hydrogen fluoride is cooled in zone 21 and, due to the resultant increase in specific gravity on cooling, it tends to displace the liquid in reaction zone 15 and thus gives rise to the thermo-siphon effect mentioned above. A stream of hydrogen fluoride may be withdrawn at port 25 for regeneration and the regenerated acid, together with such make-up acid as may be necessary, returned at 26.

Liquid hydrocarbons, containing the alkylate product and unreacted hydrocarbons is removed from the reactor by pipe 19, the interface between hydrocarbon and acid being indicated generally at 18. The hydrocarbon so withdrawn is handled in the conventional manner, being fractionated to yield unreacted hydrocarbons suitable for recycle, an alkylate of desired boiling range and a heavy fraction. The present invention is well suited to operation according to application Serial No. 549,980, filed August 4, 1944 wherein it is disclosed that an alkylation reaction in the presence of hydrogen fluoride may be conducted under conditions to evaporate a portion of the hydrogen fluoride and avoid condensation of all of the isoparaffin in excess of that which reacts with olefin to form alkylate. This expedient lowers the heat exchange load carried by the cooling zone.

The cooling medium circulated through cooling zone 21 may be liquid phase charge for the unit introduced through an expansion valve to permit evaporation of the charge in the cooling zone; thus cooling the circulated acid and providing the desired vapor for feed at pipe 11.

The embodiment of Figure 2 is very similar in operation to that of Figure 1; the principal difference being in that cooling zone 21 is an element separate from the reactor proper receiving liquid hydrogen fluoride from settling zone 16 by way of pipe 20 and returning cooled acid by pipe 22.

In a typical operation according to the present invention, a mixture of isobutane and butenes in the ratio of 7 to 1 is supplied at 212° F. and about 220 lbs. per square inch gage to liquid hydrogen fluoride maintained at 100° F. and 125 lbs. per square inch gage. The feed was made up of fresh feed supplied at 80° F. and 220 lbs. pressure in liquid state which was mixed with a recycled isobutane stream made up of uncondensed deisobutanizer overhead at 195° F. and 230 lbs. The fresh feed is vaporized and then blended with the recycled vapor for superheating to the feed temperature. The following Table I shows the make-up of the total feed to the reactor in parts by volume per unit time.

Table I

|  | Fresh feed | Recycle | Total |
|---|---|---|---|
| Isobutane | 1,259 | 2,913 | 4,172 |
| Butenes | 596 |  | 596 |
| Normal butane | 488 | 324 | 812 |
| C₅ hydrocarbons | 74 |  | 74 |
|  | 2,417 | 3,237 | 5,654 |

The feed stream is admitted through a plate having a large number of orifices, for example 7460 orifices of 0.024" diameter. The feed stream has a temperature of about 195° F. after throttling on admission to the vapor space below the plate and passing into the body of acid. The recycled acid is cooled by indirect heat exchange with cooling water or other suitable medium and is returned at a temperature sufficient to maintain the desired 100° F. in the reactor. Depending upon reactor design and conditions of operation affecting rate of acid circulation, the recycled acid should be cooled to a temperature between about 60° F. and about 90° F. to give the desired temperature control. The nature and yield of the alkylate obtained is indicated by Table II.

Table II

Parts by volume/unit time
Light alkylate _____ 1,004
Heavy alkylate _____ 39

Properties of light alkylate:
°API _____ 69.6
ASTM dist.—
  IBP _____ 126
  10% vol _____ 193
  50 _____ 222
  90 _____ 248
  EP _____ 356
RVP _____ 3.4

I claim:

1. In a process for alkylation of isoparaffins with olefins in the presence of liquid hydrogen fluoride by dispersing a vapor mixture of isoparaffin and olefin into liquid hydrogen fluoride under alkylation conditions of temperature and pressure and separating liquid hydrocarbons from the dispersion so formed; the method of conducting said process with efficient removal of heat from the reaction zone which comprises providing a cyclic path containing liquid hydrogen fluoride and adapted for free flow of liquid hydrogen fluoride successively through a laterally confined vertical reaction zone, an enlarged settling zone open to the top of said reaction zone and a cooling zone open to the bottom of said settling zone and to the bottom of said reaction zone, injecting said vapor mixture under pressure upwardly into said hydrogen fluoride in the lower part of said reaction zone, removing hydrocarbons from the upper part of said settling zone and abstracting heat from said hydrogen fluoride in said cooling zone, whereby cyclic flow of hydrogen fluoride in said cyclic path is induced by a combination of jet, gas lift and thermo-siphon effects.

2. The method of claim 1, characterized in that said isoparaffin is isobutane and said olefin is butene.

3. Apparatus for catalytic alkylation comprising a vertical tubular reactor, a settler open to the top of said tubular reactor, a vertical heat exchanger open at the upper end to the bottom of said settler and open at the bottom end to the bottom of said reactor, means to circulate a cooling medium through said heat exchanger, a plurality of upwardly directed orifices at the bottom of said reactor, means to supply a vapor mixture to said orifices for upward injection into said reactor and an outlet for liquid hydrocarbons at the top of said settler.

4. The method of claim 1 characterized in that the alkylation reaction is conducted under conditions to evaporate a portion of the hydrogen fluoride and avoid condensation of all of the isoparaffin in excess of that which reacts with olefin to form alkylate.

STUART T. HADDEN.